(12) United States Patent
Wilbert (10) Patent No.: US 8,397,390 B2
(45) Date of Patent: Mar. 19, 2013

(54) DEBRIS REMOVAL SYSTEM FOR A POWER TOOL

(75) Inventor: Edward D. Wilbert, Hubertus, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 623 days.

(21) Appl. No.: 12/509,159

(22) Filed: Jul. 24, 2009

(65) Prior Publication Data

US 2010/0018371 A1    Jan. 28, 2010

Related U.S. Application Data

(60) Provisional application No. 61/083,732, filed on Jul. 25, 2008.

(51) Int. Cl.
*B23D 53/12* (2006.01)
*B23D 55/00* (2006.01)
*B26D 7/08* (2006.01)

(52) U.S. Cl. .......................................... 30/380; 83/168
(58) Field of Classification Search .................... 30/380; 83/168

See application file for complete search history.

(56) References Cited

U.S. PATENT DOCUMENTS

| 1,427,661 | A | * | 8/1922 | Walker | 83/440.2 |
|---|---|---|---|---|---|
| 2,081,033 | A | * | 5/1937 | Biro | 83/817 |
| 2,423,363 | A | * | 7/1947 | Biro | 83/168 |
| 2,585,957 | A | * | 2/1952 | Meeker et al. | 83/168 |
| 2,617,451 | A | * | 11/1952 | Fink et al. | 83/818 |
| 2,814,318 | A | * | 11/1957 | Brown | 83/814 |
| 3,673,903 | A | * | 7/1972 | Evans | 83/168 |
| 4,141,142 | A | * | 2/1979 | Karubian | 30/380 |
| 4,242,798 | A | * | 1/1981 | Wikoff | 30/380 |
| 4,502,184 | A | * | 3/1985 | Karubian | 452/160 |
| 4,878,411 | A | * | 11/1989 | Laskowski et al. | 83/820 |
| 5,031,497 | A | * | 7/1991 | Moshier et al. | 83/168 |
| 5,440,960 | A | * | 8/1995 | Sadahiro | 83/168 |
| 6,736,037 | B2 | * | 5/2004 | Dean | 83/13 |
| 2010/0018371 | A1 | * | 1/2010 | Wilbert | 83/168 |
| 2011/0119934 | A1 | * | 5/2011 | Bertsch et al. | 30/380 |
| 2011/0197457 | A1 | * | 8/2011 | Wackwitz et al. | 30/380 |

* cited by examiner

*Primary Examiner* — Hwei C Payer
(74) *Attorney, Agent, or Firm* — Michael Best & Friedrich LLP (57) ABSTRACT

A powered hand tool includes a handle portion arranged to provide a grip point for a user, a motor, a cutting member drivable to cut a workpiece, and a drive system interconnecting the motor and the cutting member and operable to drive the cutting member in response to operation of the motor. A housing at least partially encloses the cutting member and the motor and a debris removal system is movable between a first position and a second position. The debris removal system is operable to clean a portion of the drive system when in the second position.

23 Claims, 5 Drawing Sheets

DEBRIS REMOVAL SYSTEM FOR A POWER TOOL

RELATED APPLICATION DATA

This application claims benefit under 35 U.S.C. Section 119(e) of U.S. Provisional Application No. 61/083,732, filed Jul. 25, 2008, which is fully incorporated herein by reference.

BACKGROUND

The present invention relates to a system for removing debris from power tool components, and more particularly, from band saw components.

Band saws may be various sizes to accommodate various cutting applications, and typically include a drive wheel pulley, a driven wheel pulley and a continuous saw blade positioned around the drive wheel and the driven wheel. The saw blade is driven by the drive wheel to cut work pieces (e.g., metal, wood, etc.). As the saw blade cuts the work piece, the saw blade picks up chips (e.g., metal chips, wood chips, etc.), which can embed in a blade tire of the respective wheel. The embedded chips may cause the saw blade to slip with respect to the blade tire and the wheel. When debris embeds in the blade tire, the cutting capabilities of the band saw decrease, thereby requiring removal of the blade tire for replacement or cleaning.

SUMMARY

In one construction, the invention provides a powered hand tool that includes a handle portion arranged to provide a grip point for a user, a motor, a cutting member drivable to cut a workpiece, and a drive system interconnecting the motor and the cutting member and operable to drive the cutting member in response to operation of the motor. A housing at least partially encloses the cutting member and the motor and a debris removal system is movable between a first position and a second position. The debris removal system is operable to clean a portion of the drive system when in the second position.

In another construction, the invention provides a powered hand tool that includes a housing having a handle portion arranged to provide a grip point for a user, a first blade tire rotatable about a first axis, and a second blade tire rotatable about a second axis. The first axis and the second axis are positioned a non-zero distance from one another and are arranged substantially parallel to one another. A continuous saw blade is positioned to extend around a portion of the first blade tire and a portion of the second blade tire and a motor is positioned at least partially within the housing and is operable to drive the first blade tire to move the blade along a continuous path to cut a workpiece. A debris removal system has an abrasive member positioned substantially within the housing and an actuator portion positioned at least partially outside of the housing. The debris removal system is movable between a first position and a second position in which the abrasive member is operable to clean a portion of one of the first blade tire and the second blade tire.

In yet another construction, the invention provides a powered hand tool that includes a first blade tire that is rotatable about a first axis and a second blade tire rotatable about a second axis. The first axis and the second axis are positioned a non-zero distance from one another and are arranged substantially parallel to one another. A continuous saw blade is positioned to extend around a portion of the first blade tire and a portion of the second blade tire and a motor is operable to drive the first blade tire to move the blade along a continuous path to cut a workpiece. An abrasive member is movable between a first position and a second position in which the abrasive member contacts one of the first blade tire and the second blade tire to remove debris produced during the cutting of the workpiece. An actuator portion is movable between a non-actuated position and an actuated position. Movement to the actuated position moves the abrasive member to the second position.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
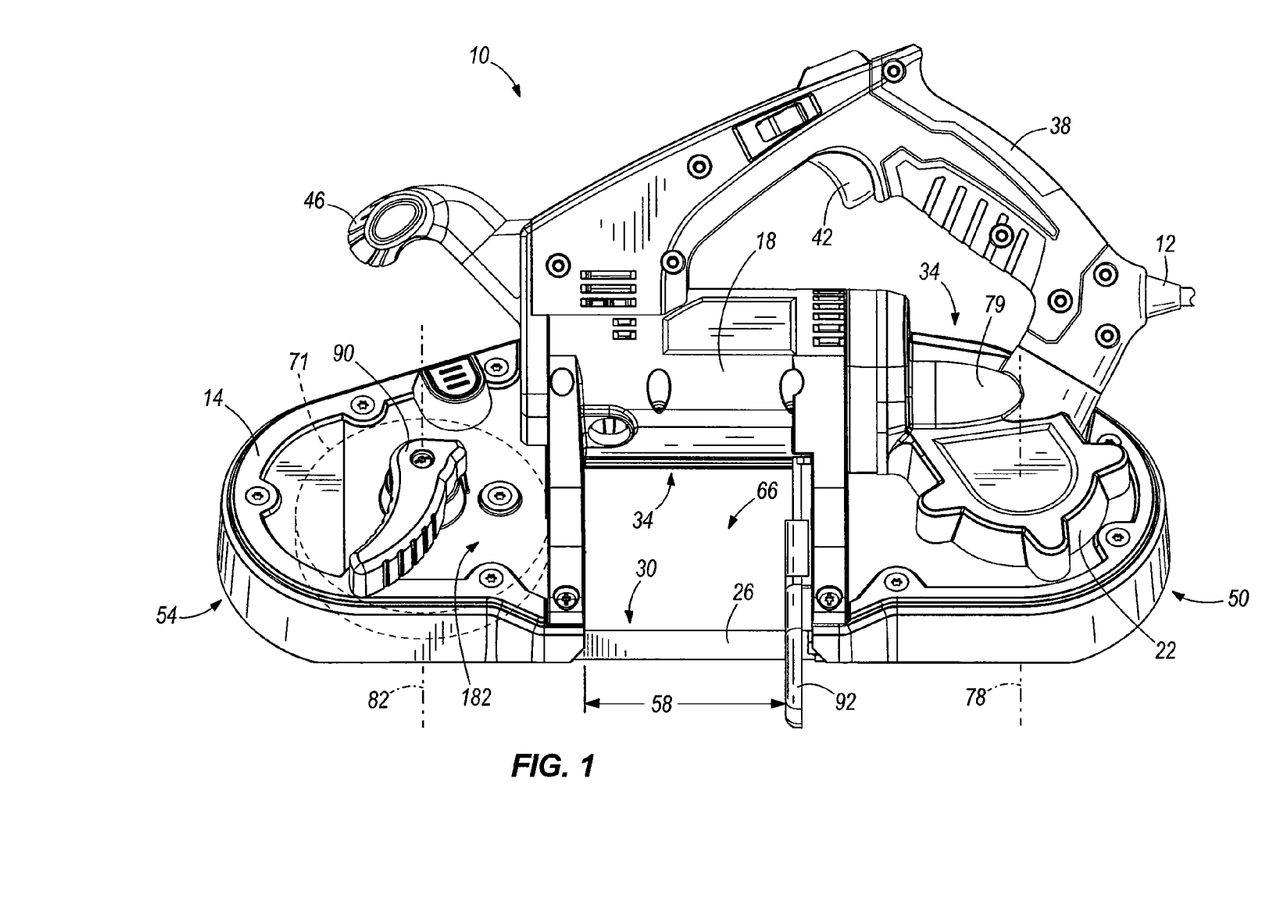
FIG. 1 is a perspective view of a band saw suitable for use with the debris removal system.

FIGS. 1-4 illustrate a band saw 10 that includes a debris removal system 94 according to one embodiment of the invention. FIG. 1 illustrates an AC version of the band saw 10 having an electrical connection cord 12. However, other embodiments may be applied to DC versions of the band saw 10 which includes one or more rechargeable battery packs that are preferably removable.

The band saw 10 includes a housing or frame 14 supporting a motor 18 and a drive system including a gear box 22. The motor 18 is drivingly connected to a drive mechanism (not shown) at least partially housed within the gear box 22. The motor 18 and the drive mechanism are operable to drive a continuous band saw blade 26 to cut a work piece. As described herein, the band saw 10 includes a front 30 and a rear 34. The front 30 is defined as the side being proximate the portion of the band saw blade 26 that cuts the work piece and the rear 34 is defined as the side proximate the portion of the band saw blade 26 that does not cut the work piece. The rear 34 is otherwise described as being opposite the front 30.

The housing 14 includes a main handle 38 supporting a switch assembly 42 to control power to the band saw 10. The switch assembly 42 is operable by the user to selectively control operation of the motor 18. The band saw 10 also includes an auxiliary handle 46 for a user's other hand. Generally, the handles 38, 46 are shaped and arranged for two-handed operation of the band saw 10 as the work piece is cut. In the illustrated embodiment, each handle 38, 46 has an ergonomic design to provide comfortable gripping and controlled operation of the band saw 10. The ergonomic design of each handle 38, 46 and of the combination of the handles may include the orientation or angle of handle(s). The ergonomic design may also include the use of material, such as an elastomeric material, on the handle(s) 38, 46 to, one or more of, provide an improved grip surface, isolate vibration and impacts from the operator, prevent heat build-up and/or transfer to the operator, etc.

The housing 14 defines a first portion 50 and a second portion 54. The first portion 50 and the second portion 54 are spaced apart from one another and define a U-shaped cavity 66 defining a cut zone 58 therebetween. A blade guard 62 (FIGS. 2-4) is positioned at the rear 34 of the band saw 10 and extends between the first and second portions 50, 54 within the cut zone 58. The blade guard 62 is positioned along the rear 34 of the band saw 10 and provides a recessed area to house the band saw blade 26. In the illustrated embodiment, the blade guard 62 extends parallel to the portion of the band saw blade 26 in the cut zone 58 at the front 30 of the band saw 10.

Figure 2:
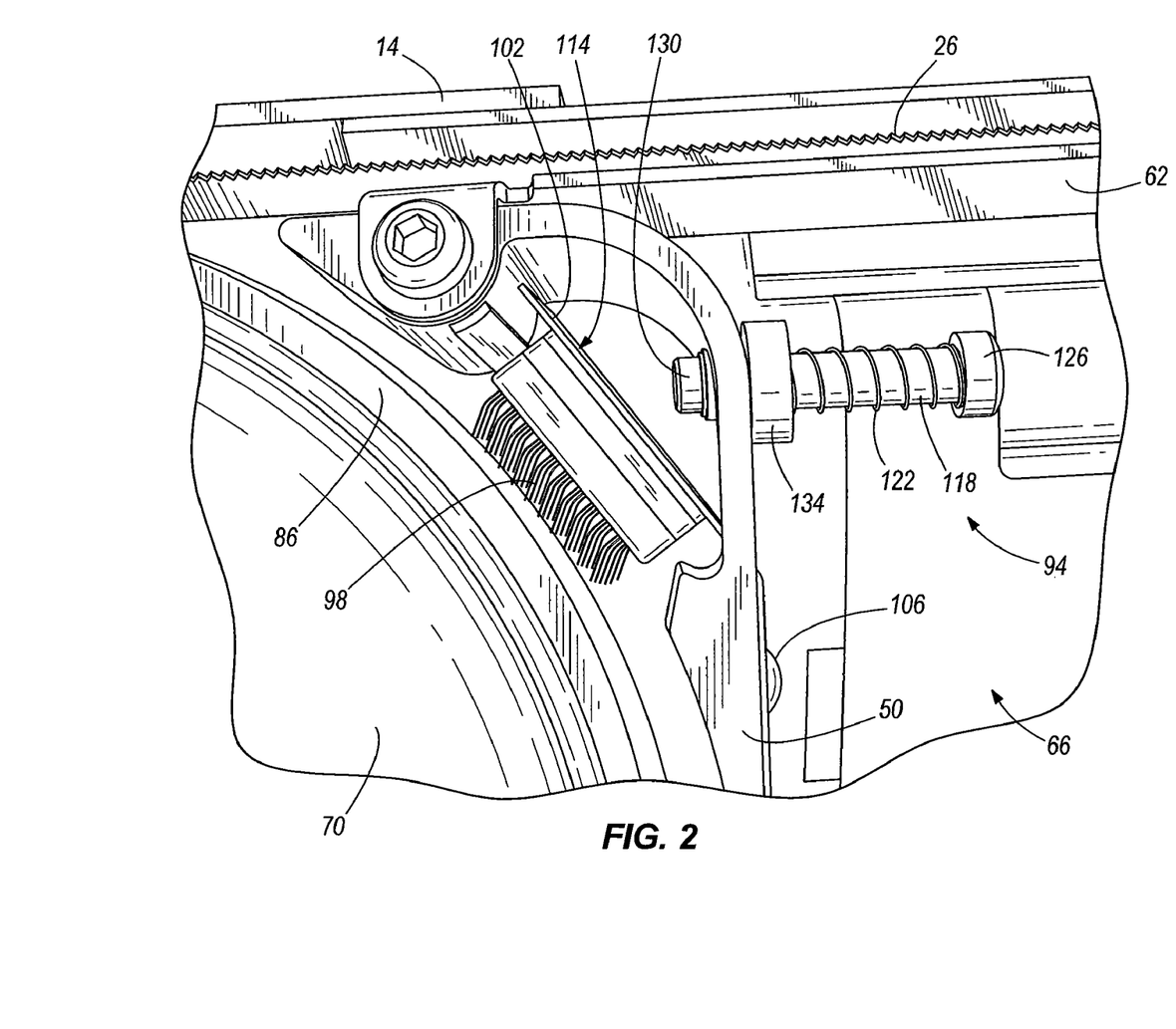
FIG. 2 is a perspective view of a debris removal system incorporated into the band saw of FIG. 1.
Figure 3:
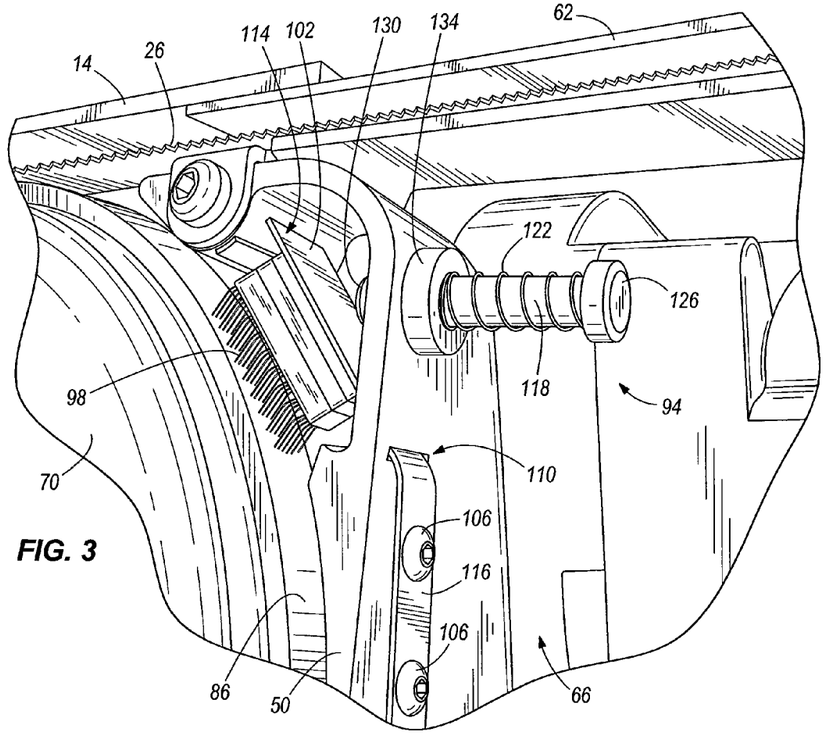
FIG. 3 is another perspective view of the debris removal system of FIG. 2 in a first or non-actuated position.
Figure 4:
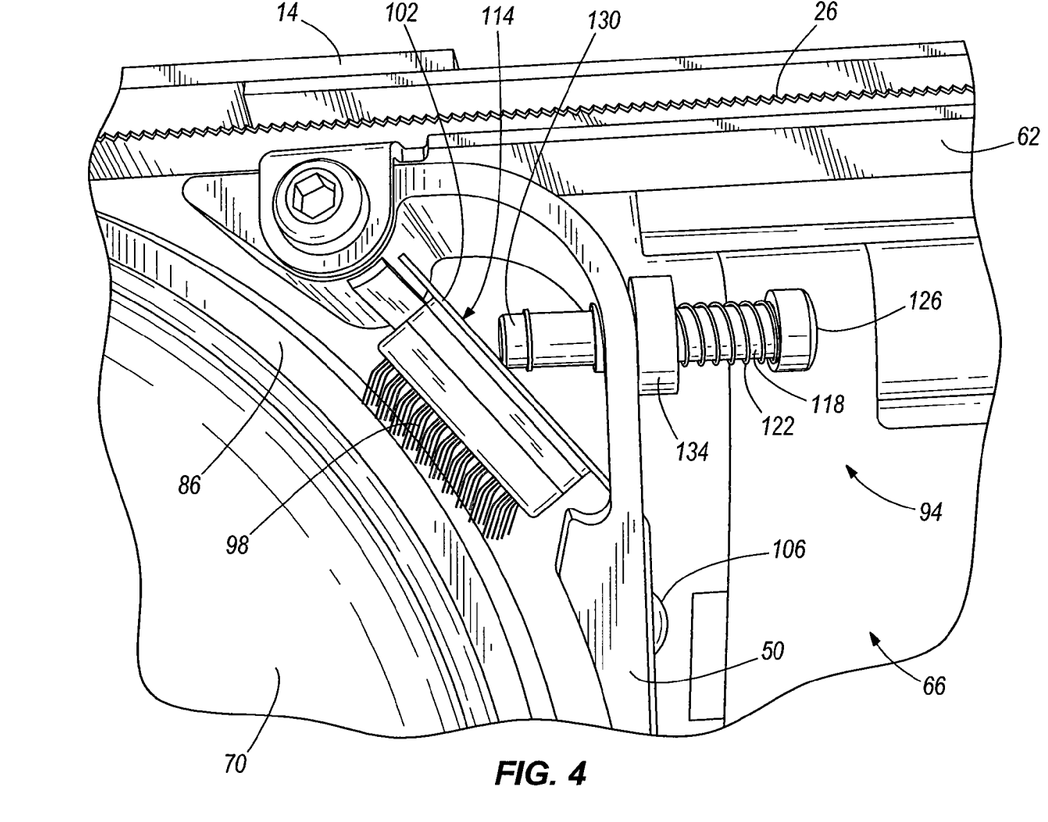
FIG. 4 is a perspective view of the debris removal system of FIG. 2, in a second or actuated position.

As shown in FIGS. 2-4, the band saw 10 generally includes a drive wheel pulley 70 and a driven wheel pulley 71. The drive wheel 70 rotates about a drive wheel axis 78 (shown in FIG. 2) and is drivingly connected to the motor 18 via a drive system 79. The driven wheel 71 rotates about a driven wheel axis 82 and is rotatably supported by the housing 14. The drive wheel 70 is positioned in the first portion 50 of the housing 14, and the driven wheel is positioned in the second portion 54 of the housing 14. A blade tire 86 is coupled to each of the peripheries of the drive wheel 70 and the driven wheel 71. Each blade tire 86 is a circular-shaped ring formed of a soft and/or flexible elastomeric material that is able to lock or adhere to the respective wheel. The band saw blade 26 extends around the drive wheel 70 and the driven wheel 71 and is gripped by the blade tires 86. In this way, motion from the drive wheel 70 is transmitted to the band saw blade 26 via the blade tires 86. The band saw 10 may also include a blade tensioning mechanism 90 to adjustably provide appropriate tension on the band saw blade 26. The band saw may also include a shoe 92 for positioning against the work piece.

The amount of grip or friction between the blade tires 86 and the band saw blade 26 depends, in part, on the tension in the band saw blade 26 and on the coefficient of friction between the blade tire 86 and the blade 26. The greater the friction between the blade tires 86 and the band saw blade 26, the greater the pull force on the band saw blade 26 by the blade tires 86 as the wheels rotate. The band saw blade 26 is designed to continuously loop about a circuit formed between the drive wheel 70 and the driven wheel 71. The band saw blade 26 generally engages approximately 180 degrees of the circular blade tire 86, while the remaining approximately 180 degrees of the blade tire 86 is separated from the band saw blade 26.

With reference to FIGS. 2-4, the band saw 10 includes a debris removal system 94 for cleaning debris from the blade tire 86. The debris may be from chips (e.g., metal or wood chips) from the work pieces or any debris that can be embedded into the elastomeric blade tire 86. The debris removal system 94 is positioned toward the rear 34 of the band saw 10, proximate the blade guard 62. The debris removal system 94 is coupled to an underside of the first portion 50 of the housing 14 and includes an abrasive 98 and a biasing member or spring 102 coupled to the abrasive 98. The abrasive 98 is positioned in the first portion 50 and adjacent to the blade tire 86 of the drive wheel 70 at a segment of the blade tire 86 that is not engaged with the band saw blade 26. In the illustrated embodiment, the abrasive 98 is a wire brush that scrapes the blade tire 86 to clean or remove debris therefrom. In other embodiments, the abrasive 98 is formed from a variety of materials or substrates that provide a roughened surface for contacting and cleaning the blade tire 86.

The spring 102 is a flat spring (leaf spring) that biases the abrasive 98 away from the blade tire 86, and includes a first end 114 and a second end 116 (shown in FIG. 3). The spring 102 extends through an aperture 110 (FIG. 3) formed in the first portion 50 of the housing 14 such that the first end 114 is positioned inside the first portion 50 and the second end 116 is positioned outside the first portion 50 (i.e., within the cavity 66). The first end 114 of the spring 102 is coupled to the abrasive 98, and the second end 116 of the spring 102 is coupled to the housing 14 using fasteners 106 or other suitable attachment means (e.g., adhesive, clamps, etc.). In other embodiments, the spring 102 is positioned anywhere on the housing such that the abrasive 98 is able to engage the blade tire 86. In still other embodiments, the wheel is open to the cavity 66 and the spring 102 and the abrasive 98 are positioned in the cavity to engage with the blade tire 86 of the wheel. The drive wheel 70, and therein the blade tire 86, rotate such that the abrasive 98 removes debris from the blade tire 86 as the drive wheel 70 rotates, and in some embodiments, prior to engagement of the blade tire 86 with the band saw blade 26.

With continued reference to FIGS. 2-4, the debris removal system 94 further includes an actuator or button 118 and an actuator spring 122 compressed by the actuator 118. The actuator 118 is substantially cylindrical shaped, and includes a first hub 126 and a second hub 130 positioned at opposing ends of the actuator 118. The first hub 126 provides an area for a user to manipulate the actuator 118, and the second hub 130 is positioned proximate the spring 102 for engaging and moving the spring 102. The actuator 118 is movable between a first position in which the actuator 118 does not displace the spring 102 and a second position in which the actuator 118 engages and displaces the spring 102. The abrasive 98 engages the blade tire 86 in response to movement of the actuator 118 to the second position. When the actuator 118 is released, the actuator spring 122 biases the actuator 118 to the first position and the spring 102 biases the abrasive 98 to the non-contact position illustrated in FIG. 2. In other embodiments, other actuators may be used to engage the abrasive 98 with the blade tire 86.

The actuator spring 122 is a coil compression spring, and is positioned around the actuator 118 and compressed between the first hub 126 and a shoulder 134 of the debris removal system 94 that is proximate the housing 14. The actuator spring 122 biases the actuator 118, and in particular the second hub 130, away from the spring 102. FIGS. 2 and 3 illustrate the actuator 118 in a neutral or release position biased away from the spring 102 by the actuator spring 122. To engage the abrasive 98 with the blade tire 86, and thereby move the actuator 118 into a cleaning position (shown in FIG. 4), the actuator 118 (i.e., the first hub 126) is pressed by a user's hand, as shown in FIG. 4. The force applied by the user causes the actuator 118 to move toward the spring 102 against the biasing force of the actuator spring 122. The second hub 130 of the actuator 118 pushes the spring 102 against the biasing force of the spring 102 until the abrasive 98 engages the blade tire 86 to remove debris from the tire 86.

Figure 5:
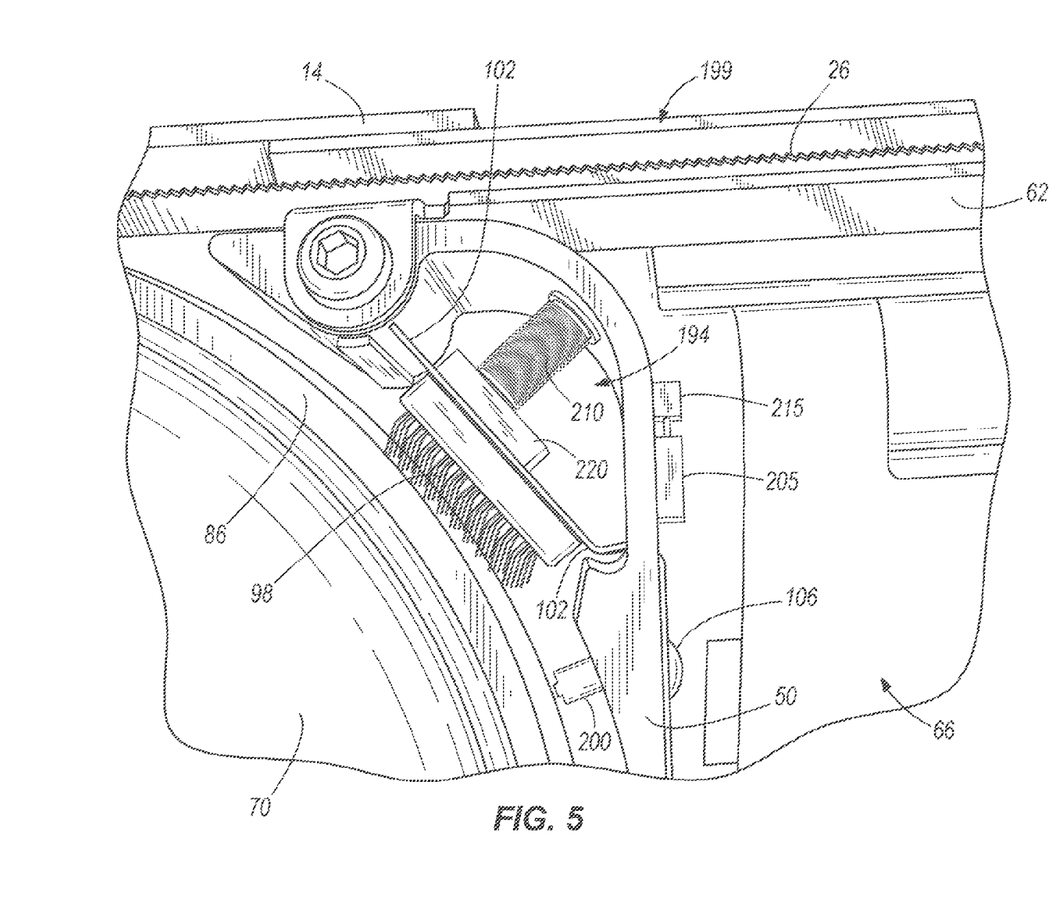
FIG. 5 is a perspective view of an automatically actuated debris removal system incorporated into the band saw of FIG. 1.

In some embodiments, an automated debris removal system 199 is employed. For example, FIG. 5 illustrates a construction in which a sensor 200 is positioned adjacent the blade tire 86 to count revolutions of the blade tire 86. A controller 205, such as a simple micro-controller or integrated circuit includes a counter that counts the revolutions of the blade tire 86 and generates a signal when the number of revolutions exceeds a predetermined number. The controller 205 then resets the counter to zero and begins counting again. The signal is transmitted to an electromechanical device 210 such as a solenoid, a motor, a piezoelectric element, or, as illustrated in FIG. 5, a simple electromagnet arrangement. In the construction of FIG. 5, the electromechanical device 210 is positioned adjacent the leaf spring 102. The signal from the controller 205 actuates a switch 215 that energizes the electromechanical device 210. A permanent magnet 220 may be attached to the leaf spring 102 to assure that when the electromechanical device 210 is energized, the leaf spring 102 is repelled rather than attracted. After a predetermined time period or a predetermined number of revolutions, the electromechanical device 210 is deenergized and the cycle repeats. Thus, in the automated construction of FIG. 5, the user does not need to actuate the debris removal system. Rather, the system automatically periodically removes debris.

In other automated systems, the leaf spring 102 may be arranged to bias the abrasive member 98 into contact with the blade tire 86. In these constructions, the electromechanical device 210 is energized when cleaning is not occurring. While this arrangement is possible, it would result in reduced battery life or additional power consumption.

In other embodiments, the debris removal system 94 (manual or automatic) can be positioned at other points along the exposed portion of the blade tire 86 of the drive wheel 70 such that the abrasive 98 cleans the blade tire 86 prior to engagement with the band saw blade 26. In still other embodiments, the debris removal system 94 is coupled to the second portion 54 of the housing 14 and the abrasive 98 is positioned proximate the blade tire of the driven wheel 71. In yet another embodiment, the band saw 10 includes more than one debris removal system 94 for removing debris from either or both of the blade tires.

In operation, the band saw blade 26 rotates about the drive wheel 70 and the driven wheel. The drive wheel 70 is driven by the motor 18 and the drive system or mechanism. As the drive wheel 70 rotates, the blade tire 86 frictionally engages or grips the band saw blade 26 to transmit the rotational movement of the drive wheel 70 to the band saw blade 26. The movement of the band saw blade 26 cuts a work piece and, in some cases, produces debris (e.g., chips). The debris is prone to enter the housing 14 and attach to or embed in the blade tire 86.

To remove the debris and clean the blade tire 86, the debris removal system 94 can be periodically actuated by a user while the band saw is operating. As shown in FIG. 4, a user presses the actuator 118 to move it toward the second position against the biasing force of the actuator spring 122. The second hub 130 of the actuator 118 contacts the second end 116 of the abrasive spring 102 and forces (i.e., deflects) the abrasive spring 102 toward the blade tire 86. The abrasive 98 engages the blade tire 86, and begins to scrape and remove debris on or embedded in the blade tire 86. In the illustrated embodiment, the debris removal system 94 removes debris when the band saw blade 26 is in operation. However, other embodiments may include a system that removes debris when the band saw 10 is turned OFF.

In constructions that employ the automated debris removal system 194 of FIG. 5, the user simply uses the band saw as if it had no system 199. The sensor 200 detects each revolution of the blade tire 86 and the counter counts those revolutions. Once the number of revolutions exceeds a predetermined number, the micro-controller 205 generates a signal to close a switch 215 (e.g., transistor, relay, etc.) and energize the electromechanical device 210. The electromechanical device 210 is positioned adjacent the permanent magnet 220 arranged to have the same polarity as the electromechanical device 210 when energized. Thus, the electromechanical device 210 repels the permanent magnet 220 and the leaf spring 102 to which it is attached to push the abrasive member 98 into contact with the blade tire 86 to clean the blade tire 86. A timer or the sensor 200 and counter assures that the abrasive 98 remains in contact with the blade tire 86 for a sufficient time or a sufficient number of revolutions before the electromechanical device 210 is deenergized.

Removal of debris from the blade tires 86 reduces band saw blade slippage and reduces the likelihood of the blade 26 falling off the drive wheel 70 and/or the driven wheel 71. Debris reduces the coefficient of friction between the blade tire 86 and the blade 26 and degrades the pull force on the blade 26 from the blade tires 86, thereby decreasing the cutting capability of the blade 26. By removing the debris, the gripping capabilities and the coefficient of friction increase such that the blade tire 86 is able to transmit rotation and thereby maintain the cutting force provided by the band saw blade 26.

In other embodiments, the actuator 118 is alternately positioned in another position on the band saw 10, such as, for example, on a top side 182 (FIG. 1) of the housing 14. In these constructions, a linkage arrangement may be employed to produce the desired movement of the abrasive member.

In still other embodiments, the abrasive 98 is formed of a material that allows the abrasive 98 to remain in constant engagement with the blade tire 86. In a further embodiment, the abrasive 98 is coupled to the band saw 10 in an engaged position against the blade tire 86 such that user actuation of the debris removal system is not required. For example, a scraper could be positioned immediately adjacent the blade tire 86 or in constant contact with the blade tire 86 to continuously remove debris.

In the embodiment of FIGS. 1-5, the abrasive 98 engages the blade tire 86 when the debris removal system 94 is actuated. In other embodiments, the abrasive 98 is partially engaged with the blade tire 86 when in a neutral or release position and is able to remove some debris, and when the debris removal system 94 is fully engaged with the blade tire 86, the abrasive 98 removes all or most of the debris.

In other embodiments, the debris removal system is used on a variety of power tools that have moving components affected by debris embedding or attaching to those components.

Although particular constructions embodying independent aspects of the present invention have been shown and described, other alternative constructions will become apparent to those skilled in the art and are within the intended scope of the independent aspects of the present invention.

What is claimed is:

1. A powered hand tool comprising:
   a handle portion arranged to provide a grip point for a user;
   a motor;
   a cutting member drivable to cut a workpiece;
   a drive system interconnecting the motor and the cutting member and operable to drive the cutting member in response to operation of the motor;
   a housing at least partially enclosing the cutting member and the motor; and
   a debris removal system movable between a first position and a second position, the debris removal system operable to clean a portion of the drive system when in the second position;
   wherein the debris removal system includes an abrasive member and an actuator portion;
   wherein the actuator portion includes an actuator having a portion disposed outside of the housing and movable by the user between an actuated position in which the abrasive member moves to the second position and a non-actuated position in which the abrasive member moves to the first position.

2. The powered hand tool of claim 1, wherein the cutting member is a blade and the drive system includes a first blade tire and a second blade tire arranged to drive the blade along a closed continuous path.

3. The powered hand tool of claim 2, wherein the abrasive member is positioned to contact the first blade tire when in the second position to remove debris from the first blade tire.

4. The powered hand tool of claim 3, wherein the first blade tire is a drive tire driven by the motor to drive the blade along the closed continuous path.

5. The powered hand tool of claim 1, wherein the actuator portion includes a biasing member coupled to the actuator to bias the actuator toward the non-actuated position.

6. A powered hand tool comprising:
a housing including a handle portion arranged to provide a grip point for a user;
a first blade tire rotatable about a first axis and a second blade tire rotatable about a second axis, the first axis and the second axis positioned a non-zero distance from one another and arranged substantially parallel to one another;
a continuous saw blade positioned to extend around a portion of the first blade tire and a portion of the second blade tire;
a motor positioned at least partially within the housing and operable to drive the first blade tire to move the blade along a continuous path to cut a workpiece; and
a debris removal system having an abrasive member positioned substantially within the housing and an actuator portion positioned at least partially outside of the housing, the debris removal system movable between a first position and a second position in which the abrasive member is operable to clean a portion of one of the first blade tire and the second blade tire.

7. The powered hand tool of claim 6, wherein the abrasive member is positioned to contact the first blade tire when in the second position to remove debris from the first blade tire.

8. The powered hand tool of claim 6, wherein the actuator portion includes an actuator having a portion disposed outside of the housing and movable by the user between an actuated position in which the abrasive member moves to the second position and a non-actuated position in which the abrasive member moves to the first position.

9. The powered hand tool of claim 8, wherein the actuator portion includes a biasing member coupled to the actuator to bias the actuator toward the non-actuated position.

10. A powered hand tool comprising:
a housing including a handle portion arranged to provide a grip point for a user;
a first blade tire rotatable about a first axis and a second blade tire rotatable about a second axis, the first axis and the second axis positioned a non-zero distance from one another and arranged substantially parallel to one another;
a continuous saw blade positioned to extend around a portion of the first blade tire and a portion of the second blade tire;
a motor positioned at least partially within the housing and operable to drive the first blade tire to move the blade along a continuous path to cut a workpiece; and
a debris removal system having an abrasive member positioned substantially within the housing and an actuator portion positioned at least partially outside of the housing, the debris removal system movable between a first position and a second position in which the abrasive member is operable to clean a portion of one of the first blade tire and the second blade tire;
wherein the abrasive member includes a wire brush and a leaf spring, the leaf spring supporting the wire brush and connected to the housing in a cantilever fashion, wherein the leaf spring biases the wire brush toward the first position.

11. The powered hand tool of claim 10, wherein the housing includes a stop positioned to engage one of the leaf spring and the wire brush when in the second position to inhibit further movement toward the drive system.

12. A powered hand tool comprising:
a first blade tire rotatable about a first axis and a second blade tire rotatable about a second axis, the first axis and the second axis positioned a non-zero distance from one another and arranged substantially parallel to one another;
a continuous saw blade positioned to extend around a portion of the first blade tire and a portion of the second blade tire;
a motor operable to drive the first blade tire to move the blade along a continuous path to cut a workpiece;
an abrasive member movable between a first position and a second position in which the abrasive member contacts one of the first blade tire and the second blade tire to remove debris produced during the cutting of the workpiece; and
an actuator portion movable between a non-actuated position and an actuated position, wherein movement to the actuated position moves the abrasive member to the second position.

13. The powered hand tool of claim 12, wherein the abrasive member is positioned to contact the first blade tire when in the second position to remove debris from the first blade tire.

14. The powered hand tool of claim 13, wherein the actuator portion includes a sensor and an automatic actuator, and wherein the automatic actuator moves the abrasive member from the first position to the second position in response to the sensor.

15. The powered hand tool of claim 14, wherein the sensor senses the revolutions of one of the first tire and the second tire and generates a signal in response to the number of rotations exceeding a predetermined number of revolutions.

16. The powered hand tool of claim 15, wherein the automatic actuator includes an electromagnetic device that energizes in response to the signal to move the abrasive member to the second position.

17. The powered hand tool of claim 12, further comprising a housing that at least partially encloses the first blade tire, the second blade tire, and the motor.

18. The powered hand tool of claim 12, wherein the actuator portion includes an actuator having a portion movable by the user between an actuated position in which the abrasive member moves to the second position and a non-actuated position in which the abrasive member moves to the first position.

19. The powered hand tool of claim 18, wherein the actuator portion includes a biasing member coupled to the actuator to bias the actuator toward the non-actuated position.

20. A powered hand tool comprising:
a first blade tire rotatable about a first axis and a second blade tire rotatable about a second axis, the first axis and the second axis positioned a non-zero distance from one another and arranged substantially parallel to one another;

a continuous saw blade positioned to extend around a portion of the first blade tire and a portion of the second blade tire;

a motor operable to drive the first blade tire to move the blade along a continuous path to cut a workpiece;

an abrasive member movable between a first position and a second position in which the abrasive member contacts one of the first blade tire and the second blade tire to remove debris produced during the cutting of the workpiece;

an actuator portion movable between a non-actuated position and an actuated position, wherein movement to the actuated position moves the abrasive member to the second position; and a housing that at least partially encloses the first blade tire, the second blade tire, and the motor;

wherein the abrasive member includes a wire brush and a leaf spring, the leaf spring supporting the wire brush and connected to the housing in a cantilever fashion, wherein the leaf spring biases the wire brush toward the first position.

21. The powered hand tool of claim 20, wherein the housing includes a stop positioned to engage one of the leaf spring and the wire brush when in the second position to inhibit further movement toward the drive system.

22. A powered hand tool comprising:
a handle portion arranged to provide a grip point for a user;
a motor;
a cutting member drivable to cut a workpiece;
a drive system interconnecting the motor and the cutting member and operable to drive the cutting member in response to operation of the motor;
a housing at least partially enclosing the cutting member and the motor; and
a debris removal system movable between a first position and a second position, the debris removal system operable to clean a portion of the drive system when in the second position;
wherein the debris removal system includes an abrasive member and an actuator portion; and
wherein the abrasive member includes a wire brush and a leaf spring, the leaf spring supporting the wire brush and connected to the housing in a cantilever fashion, wherein the leaf spring biases the wire brush toward the first position.

23. The powered hand tool of claim 22, wherein the housing includes a stop positioned to engage one of the leaf spring and the wire brush when in the second position to inhibit further movement toward the drive system.

* * * * *